United States Patent [19]

Inoue et al.

[11] Patent Number: 4,615,919

[45] Date of Patent: Oct. 7, 1986

[54] LIQUID CRYSTAL DEVICE

[75] Inventors: Hiroshi Inoue, Yokohama; Keiko Nakohsai, Atsugi, both of Japan

[73] Assignee: Canon Kabushiki Kaisha, Tokyo, Japan

[21] Appl. No.: 784,763

[22] Filed: Oct. 7, 1985

[30] Foreign Application Priority Data

Oct. 9, 1984 [JP] Japan ................. 59-210449
Oct. 9, 1984 [JP] Japan ................. 59-210450
Oct. 9, 1984 [JP] Japan ................. 59-210451
Oct. 9, 1984 [JP] Japan ................. 59-210452

[51] Int. Cl.⁴ .............................................. C09K 3/34
[52] U.S. Cl. ......................................... 428/1; 350/341
[58] Field of Search ......................... 428/1; 350/341

[56] References Cited

U.S. PATENT DOCUMENTS 4,409,268 10/1983 Inoue et al. ........................... 428/1

Primary Examiner—Alexander S. Thomas
Attorney, Agent, or Firm—Fitzpatrick, Cella, Harper & Scinto

[57] ABSTRACT

A liquid crystal device, comprising a pair of base plates and a liquid crystal disposed between the base plates. At least one of the pair of base plates has a coating film formed from a coating solution containing a nylon, an epoxy resin and at least one member selected from the group consisting of organic tantalum compounds and organic indium compounds.

44 Claims, 2 Drawing Figures

LIQUID CRYSTAL DEVICE

FIELD OF THE INVENTION AND RELATED ART

This invention relates to a liquid crystal panel comprising a liquid crystal material sealed between a pair of base plates to be used for various displays, etc., particularly to an orientation or alignment controlling film formed on the base plate surface for uniformly aligning the liquid crystal molecules in such liquid crystal panel.

A liquid crystal panel generally consists of a pair of base plates, of which at least one is transparent, provided with electrodes composed mainly of, e.g., tin oxide or indium oxide and a liquid crystal material disposed therebetween so as to be applied with a voltage between the electrodes. Such a liquid crystal panel is utilized widely for various displays, and it has been practiced to uniformly align the liquid crystal molecules in order to improve the clearness of the displayed image. As a means for orientating or aligning uniformly the liquid crystal molecules, it has been known to form a very thin film having the action of controlling alignment or orientation of the liquid crystals, namely an alignment controlling film on a base plate.

In the prior art, as the above mentioned alignment controlling film, a coating film of the reaction product of a nylon, an epoxy resin and an organic titanate has been known (Japanese Laid-Open Patent Application No. 14220/1981; U.S. Pat. No. 4,409,268). This alignment controlling film can be formed by applying a mixed solution of the above three components on a base plate and thereafter heating the applied layer at a relatively low temperature (130° to 150° C.), and therefore has an advantage of being applicable to a case where plastic base plates excellent in bulk productivity are employed or where a switching element having a poor resistance to heat is provided adjacent thereto.

However, according to the experiments by us, when a liquid crystal panel having the alignment controlling film as described above formed thereon is used, there is a problem that satisfactory durability or aging resistance cannot be obtained so easily. If the aging resistance is insufficient, alignment of liquid crystal molecules will be disturbed with lapse of time, whereby the clearness of the image may be lowered with occurrence of streaks in the image, etc.

SUMMARY OF THE INVENTION

An object of the present invention is to provide a liquid crystal device, which can be formed by heating at such a relatively low temperature that a base plate made of a plastic material or also provided with a switching element with poor resistance to heat can sufficiently be resistant thereto, and yet can exhibit excellent resistance to aging.

DETAILED DESCRIPTION OF THE INVENTION

In the present invention, a nylon exhibits excellent orientation action, while an organic tantalum or indium compound and an epoxy resin fulfill the action of, so to speak, reinforcing agents, which can assist the formation of a stable coating film without impairing the orientation action of the nylon. Further, an organic tantalum or indium compound has also a function of supplementing the orientation action of nylon. Although the reaction modes of these three components have not yet been clarified, the following mechanisms are speculated by us. That is, while a nylon and an epoxy resin are known to undergo condensation polymerization, an organic tantalum or indium compound will not react directly with a nylon so easily. Accordingly, it may be considered that first the nylon and the epoxy resin will undergo condensation polymerization, and the organic tantalum or indium compound may be bound to the epoxy resin bonded to the nylon in such a form as coordination bonding to stabilize the whole compound. Since these reactions can be caused at relatively low temperatures, an alignment controlling film excellent and stable in orientation characteristic can be obtained by heating at a relatively low temperature.

Figure 1:
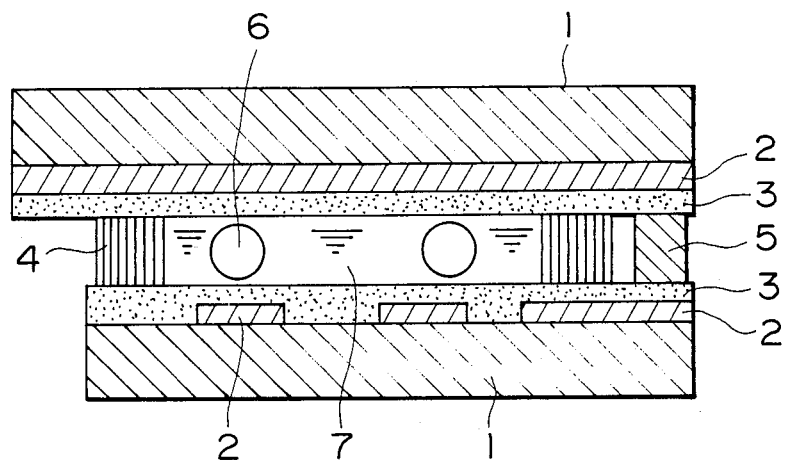
FIGS. 1 and 2 are sectional views of the liquid crystal devices of the present invention.

In FIG. 1, reference numeral 1 denotes a base plate, 2 an electrode comprising a transparent electroconductive film provided on the base plate 1, 3 an alignment controlling film, 4 a sealing material layer, 5 a conductive layer between the upper and lower base plates, 6 a gap-forming agent and 7 a liquid crystal material.

The base plates 1, of which at least one is transparent, may comprise an inorganic glass or as well a plastic film such as of aromatic heat resistant polyester (e.g., polyethyleneterephthalate, polybutyleneterephthalate, etc.), polyethersulfone, polysulfone, polycarbonate, cellulose acetate, diene type rubber, acrylic resin, urethane type resin, etc. By utilizing a plastic film for the base plates 1, the bulk or mass productivity of the liquid crystal panel can be improved. Particularly, the alignment controlling film 3 as hereinafter described can be very useful, when the base plate 1 is made of a plastic film.

The electrode 2 provided on the above base plate 1 is a transparent electroconductive film composed mainly of, for example, tin oxide, indium oxide, etc., and mounted on the above base plate by vapor deposition, low temperature sputtering, CVD (chemical vapor deposition), etc. Also, on the base plate 1 are formed a coating film composed mainly of the reaction product of an organic tantalum or indium compound, a nylon and an epoxy resin as the alignment controlling film 3. Between the base plates 1 provided with the above electrode 2 and the alignment controlling film 3, a liquid crystal material 7 (TN liquid crystal, guest-host liquid crystal) is sealed in together with a gap-forming agent 6 for maintaining the distance between the base plates 1.

Next, the alignment controlling film 3 is to be described in detail.

As the organic tantalum compound, compounds represented by the formula Ta—OR$^1$)$_5$ (wherein R$^1$ is an alkyl group such as ethyl, propyl, butyl, pentyl, etc.) may be used. Particularly, Ta—OC$_2$H$_5$)$_5$ is preferred because it is produced in high purity and also excellent in alignment controlling ability and reinforcing function.

As the organic indium compound, alkoxy indium compounds represented by the formula In—OR$^2$)$_3$ (wherein R$^2$ an alkyl such as ethyl, propyl, butyl, pentyl, etc.) can be used. Particularly, a compound wherein R$^2$ is propyl is preferred because it is produced in high purity and also excellent in alignment controlling ability and reinforcing function. Also, as another organic indium compound, indium acetyl-acetonate is preferred.

As the nylon, for easiness of handling, nylon copolymers as well as 6-nylon, 6,6-nylon and 12-nylon are preferred. Above all, for easiness of formation of a solution to provide a coating film, 12-nylon or a copolymer thereof is preferred. Further, an alcohol-soluble nylon copolymer is preferred in processibility for formation of a coating film. Alcohol-soluble nylon copolymers may include 6/6,6-nylon, 6/11-nylon, 6/6,6/11-nylon, 6,6/11-nylon, 6/6,6/12-nylon, etc. Also, particularly when the base plate 1 is made of a plastic material or a switching element poorly resistant to heat is provided in combination, it is preferred to use a nylon with a melting point of about 80° to 130° C. so that a coating film excellent in alignment controlling ability may be obtained by heating at a relatively low temperature.

As the epoxy resin, there may be employed glycidyl ether type, glycidyl ester type, bisphenol type, glycidyl amine type, cyclic aliphatic type, linear aliphatic type, etc., of which a bisphenol type epoxy resin, i.e., a polycondensed glycidyl ether of a bisphenol is preferred for easiness of handling and reactivity during formation of a coating film. Particularly, in order to obtain a satisfactory alignment controlling ability of the coating film, a bisphenol A-type liquid epoxy resin respectively the following formula is preferred.

drying under heating, to form an alignment controlling film 3.

As the above solvent, there may be employed alcohols such as ethanol, methanol, butanol, isopropyl alcohol, etc., ketones such as acetone, methyl ethyl ketone, dimethyl ketone, etc , cyclic ethers such as tetrahydrofuran, dioxane, etc., and mixtures thereof, which may be selected in view of the solubilities for respective components, non-reactivity with the respective components as well as volatility during formation of the coating film. The concentration of the above three components in such a solvent may preferably be 0.1 to 5 wt. %, particularly preferably 3 wt. % or less as solids including the organic titanium or indium compound calculated as the oxide thereof for obtaining excellent orientation performance and uniformity of the coating film.

The above solution can be applied onto the base plate 1 easily according to the dipping method or the spraylng method. Drying after coating of the substrate 1 may preferably be conducted at 60° to 150° C. for about 30 to 300 minutes. In order to prevent occurrence of partially poor alignment, the drying time should particularly suitably be 100 to 200 minutes. Also, after drying, by forming a uniaxial orientation axis by rubbing treatment with a cotton cloth, etc., under a static

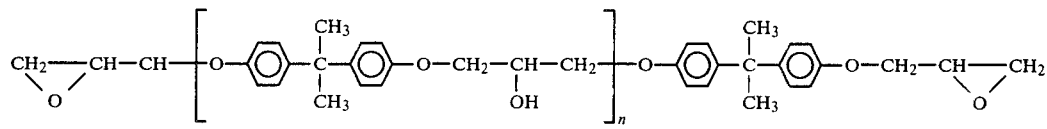

wherein n is 0 to 4.

The ratio of the components of the alkoxy organic indium (A₁), nylon (B) and epoxy resin (C) in the alignment controlling film 3 should preferably be $A_1/B/C = 5-30/10-100/1-10$ (weight ratio, $A_1$ being calculated in terms of $In_2O_3$), optimally around $A_1/B/C = 21/4/2$.

On the other hand, the ratio of the components of the organic tantalum compound (A₂), nylon (B) and epoxy resin (C) in the orientation controlling film 3 should preferably be $A_2/B/C = 5-80/2-100/1-10$ (weight ratio $A_2$ being calculated in terms of $Ta_2O_5$), optimally around $A_2/B/C = 25/5/2$.

Also, indium acetylacetonate can be used singly as an organic indium compound, but it can also be used in combination with the alkoxy indium compound as described above. In this case, the ratio of indium acetylacetonate to the alkoxy indium compound, e.g., indium octylate, in the alignment controlling film 3 may preferably be 5 – 10:0.2 – 1 (weight ratio), particularly around 8:0.3 from the viewpoint of stability of the solution.

The ratio of the components of indium acetylacetonate (A₃), nylon (B) and epoxy resin (C) in the alignment controlling film 3 should preferably be $A_3/B/C = 5-30/10-50/1-10$ (weight ratio, $A_3$ being calculated in terms of $In_2O_3$), optimally around $A_3/B/C = 18/3/2$.

Formation of the coating film composed mainly of the reaction product of the organic tantalum or indium compound, the nylon and the epoxy resin as the alignment controlling film 3 on the base plate may be easily effected as follows That is, an organic tantalum or indium compound, a nylon and an epoxy resin are dissolved in a solvent, and the resulting coating solution is applied on the surface of the base plate 1, followed by pressure of 20 to 200 g/cm², optimally about 100 g/cm², an alignment controlling film 3 with good orientation state can preferably be obtained.

The alignment controlling film 3 in the present invention can be formed easily as described above, and its bulk production can be continuously carried out with ease, since no vacuum step, patterning step (developing etching, peeling) or printing step ls required.

According to another preferred embodiment of the present invention, by applying the coating solution containing the above mentioned organic tantalum compound as a main component on the surface of the base plate 1, followed by drying by heating, an alignment controlllng film 3 can be formed. During this operation, the solvent for forming the coating solution may be alcohols such as ethanol, methanol, butanol, isopropyl alcohol, propanol, etc., ketones such as acetone, methyl ethyl ketone, dimethyl ketone, etc., cyclic ethers such as tetrahydrofuran, dioxane, etc. and mixtures thereof, which may be selected in view of solubilities for respective components non-reactivity with respective components and volatility during formation of the coating film. The concentration of the components to be dissolved in this solvent may preferably be 0.1 to 5 wt. %, particularly 3 wt. % or less as solids including the tantalum compound calculated as the oxide thereof for obtaining excellent orientation performance and uniformity of the coating film.

The above solution can be applied onto the base plate 1 easily according to the spinner coating method, the dipping method or the spraying method. A very thin coating film may be obtained uniformly, e.g. by the spinner coating method under the conditions of 1000 r.p.m. 120° C. and 30 minutes. Drying after coating of the substrate 1 may preferably be conducted at 60° to 150° C. for about 30 to 300 minutes. In order to prevent partially poor orientation, the drying time should particularly suitably be 100 to 200 minutes. Also, after drying, by forming a uniaxial orientation axis by rubbing treatment with a cotton cloth, etc., under a static pressure of 20 to 200 g/cm$^2$, optimally about 100 g/cm$^2$, an alignment controlling film 3 with good orientation state can preferably be obtained.

Figure 2:
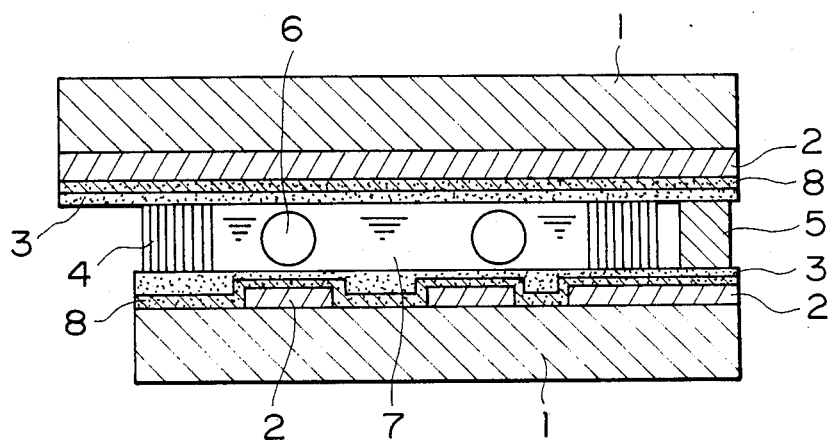

To describe now about another preferred embodiment of the present invention by referring to FIG. 2, the alignment controlling film 3 is formed on the base plate 1 through a coupling agent layer 8, as shown in the figure. The coupling agent layer 8 is a coating film formed from a coating solution comprising an organic tantalum or indium compound as the main component, and the alignment controlling film 3 is a coating film composed mainly of the reaction product between a nylon and an epoxy resin. The organic tantalum or indium compound, the nylon and the epoxy resin employed here are the same as in the embodiment as described by referring to FIG. 1.

In FIG. 2, the same symbols as in FIG. 1 indicate the same members.

In this embodiment, the layer 8 of the organic tantalum or indium compound which is a coupling agent may be considered to be bound to the coating film 3 consisting mainly of the reaction product of the nylon and the epoxy resin and forming the alignment controlling film, thereby fixing stably said coating film as a whole to the base plate. Also, in this case, except for the organic tantalum or indium compound acting as a coupling agent, the respective components may be considered to have the same actions as in the embodiment as previously described. In this embodiment, while the organic tantalum or indium compound is dissolved in a solvent, the nylon and the epoxy resin may be dissolved separately in a solvent, and the resultant solutions may be applied successively on the surface of the base plate 1, followed respectively by drying under heating, to form an alignment controlling film 3.

The solvent employed here is the same as described above, namely, alcohols such as ethanol, methanol, butanol, isopropyl alcohol, propanol, etc., ketones such as acetone, methyl ethyl ketone, dimethyl ketone, etc., cyclic ethers such as tetrahydrofuran, dioxane, etc. and mixtures thereof, which may be selected in view of solubilities for respective components, non-reactivity with respective components and volatility during formation of the coating film. Also, as the solvent for the organic indium compound, it is possible to add an ester type solvent such as ethyl acetate, isoamyl acetate, etc. The concentration of the components to be dissolved in these solvents may preferably be 0.1 to 5 wt. %, particularly 2.5 wt. % or less as solids including the tantalum or indium compound as the oxide for obtaining excellent orientation performance and uniformity of the coating film.

The above solution ca be applied onto the base plate 1 easily according to the spinner coating method, the dipping method or the spraying method. A very thin coupling agent layer 8 may be formed uniformly, e.g., by the spinner coating method under the conditions of 1000 r.p.m., 120° C. and 30 minutes. Drying after coating of the substrate 1 may preferably be conducted at 60° to 150° C. for about 30 to 300 minutes. The drying time should suitably be 100 to 200 minutes Also, after drying, by forming a uniaxial orientation axis by rubbing treatment with a cotton cloth, etc., under a static pressure of 20 to 200 g/cm$^2$, optimally around 100 g/cm$^2$, an orientation controlling film 3 with good orientation state can preferably be obtained.

The orientation controlling film 3 in the present invention can be formed easily as described above, and its bulk production can be continuously carried out with ease, since no vacuum step, patterning step (developing etching, peeling) or printing step is required.

As described above, when an alignment controlling film 3 is formed as a coating film of the reaction product of nylon (B) and epoxy resin (C) with the organic tantalum compound (A$_1$) as the coupling agent layer 8, the ratio of these components may preferably be A$_1$/B/C=5−30/1−60/1−5 (weight ratio, A$_1$ being calculated in terms of Ta$_2$O$_5$), optimally around A$_1$/B/C=7/5/2.

Also, as described above, the coupling agent to be used in the coupling agent layer 8 may be an alkoxy indium represented by the formula In—OR$^2$)$_3$ (wherein R$^2$ is an alkyl group such as ethyl, propyl, butyl, pentyl, etc.), preferably one wherein R$^2$ is isopropyl group for the reason that a highly pure product is obtained to provide excellent alignment controlling ability and excellent action as the coupling agent Also, as the alkoxy indium compound, those soluble in an ester type solvent may be preferred. The coupling agent is applied on the base plate 1 as a solution, and the alkoxy indium can be applied as a solution in an ester type solvent to give at the same time a high alignment controlling action and supplement the alignment controlling action of the alignment controlling film 3. Also, a solution of an alkoxy indium dissolved in an ester type solvent has an advantage of good storage stability. More preferably, it is soluble in an ester type solvent with a boiling point of 120° C. or lower such as ethyl acetate, isoamyl acetate, etc. This is because the solvent can be evaporated by heating at a low temperature as low as possible to enable functioning of the coupling agent.

When an alignment controlling film 3 is formed as a coating fllm of the reaction product of the nylon (B) and the epoxy resin (C) as the main components with an alkoxy indium (A$_2$) forming the coupling agent layer 8, the ratio of these components may preferably be A$_2$/B/C=5−30/1−60/1−5 (weight ratio, A$_2$ being calculated in terms of In$_2$O$_3$), optimally around A$_2$/B/C=7/5/2.

On the other hand, when indium acetylacetonate (A$_3$) is used as the coupling agent, and an alignment controlling film 3 is formed as a coating film of the reaction product of the nylon (B) and the epoxy resin (C), the ratio of these components should preferably be A$_3$/B/C=30−50/5−15/250−300 (weight ratio, A$_3$ being calculated in terms of In$_2$O$_3$), optimally around A$_3$/B/C=35/11/280.

As the alignment controlling film 3 to be formed through the coupling agent layer 8 as described above, the nylon and epoxy resin described above can be used. Particularly, when the base plate made of a plastic material is used or a switching element with poor resistance to heat is provided in combination, it is preferable to use a nylon with a melting point of about 80° to 130° C. so that a coated film excellent in alignment controlling ability may be obtained by heating at a relatively low temperature.

The present invention will now be described with reference to Examples.

EXAMPLE 1

A base plate provided with a transparent electroconductive film comprising mainly indium oxide as the electrode on a polyethyleneterephthalate film with a thickness of 100μ was coated with a solution having the composition shown below, and dried at 120° C. for 120 min. Incidentally, the electrode was formed by means of a low temperature sputtering device while suppressing the film surface temperature at 120° C. or lower.

| Solution Composition: | |
|---|---|
| Solvent: | |
| Ethanol | 13 g |
| Methyl ethyl ketone | 3 g |
| Alkoxy organic indium: | |
| $In(-OCH_3H_7)_3$ | 2.1 g calculated as $In_2O_3$ |
| Nylon: | 0.4 g |
| 6/6,6/12-nylon with 12-nylon as the major component (Diamide X-103, produced by Dicel Kagaku Kogyo K.K., MW = 1000-1500; m.p. peak 105° C.) | |
| Epoxy resin: | 0.2 g |
| Bisphenol A type epoxy resin (Epikote 828, produced by Shell Chemical Co.; viscosity 120-150 cp (25° C.); epoxy equivalent: 184-194) | |

However, since $In-OC_3H_7)_3$ is hydrolyzable when left to stand in the air, a solution thereof dissolved at 25 wt. % (calculated as $In_2O_3$) in the following solvent system was employed.

| Solvent system | |
|---|---|
| n-Butanol | 16 wt. % |
| Isopropyl alcohol | 20 wt. % |
| Acetylacetone | 2 wt. % |
| Propionic acid | 24 wt. % |
| Ethyl alcohol | 32 wt. % |
| Turpentine oil | 6 wt. % |

Corresponding to the amount of the solvent system, the amounts of ethanol and methyl ethyl ketone were adjusted to make the ratio of (alkoxyorganic indium-+epoxy resin)/solvent constant.

The solution as described above was applied on a base plate by the spinner coating method under the conditions of 1000 rpm, 120° C. and 30 minutes and, after drying, applied with rubbing in one direction under a pressure of 100 g/cm². Two sheets of this base plate were placed one on another so that the upper and lower rubbing directions may cross each other at right angles, and Loche RO-TN-619 liquid crystal (pyrimidine type Δε>0 nematic liquid crystal) was filled in the gap therebetween to provide a liquid crystal panel. The results of durability test of the liquid crystal panel are shown in Table 1.

EXAMPLE 2

Epikote 828 used in Example 1 was replaced with Epikote 815 (trade name, produced by Shell Chemical Co.) with a viscosity of 8-11 cp (25° C.) and an epoxy equivalent of 183-193 and, following otherwise the same procedure as in Example 1, a liquid crystal panel was prepared. The results of durability test of this liquid crystal panel are also shown in Table 1.

EXAMPLE 3

Except for using polyethersulfone films in place of the polyethyleneterephthalate films used as the base plates in Example 1, a liquid crystal panel was prepared in the same manner as in Example 1. The results of durability test of this liquid crystal are also shown in Table 1.

EXAMPLE 4

Except for using indium octylate $In(OC_8H_{17})_3$ in place of the isopropoxyindium used in Example 1, a liquid crystal panel was prepared in the same manner as in Example 1. The results of durability test of this liquid crystal panel are also shown in Table 1.

COMPARATIVE EXAMPLE 1

Except for replacing the alkoxy indium used in Example 1 with tetraoctyl titanate, a liquid crystal panel was prepared in the same manner as in Example 1. The results of durability test of this liquid crystal panel are also shown in Table 1.

COMPARATIVE EXAMPLE 2

Except for replacing the alkoxy indium used in Example 1 with an organic aluminum octylate, a liquid crystal panel was prepared in the same manner as in Example 1. The results of durability test of this liquid crystal panel are also shown in Table 1.

TABLE 1

| | | Item | | | | | |
|---|---|---|---|---|---|---|---|
| | | Voltage application time AC 32 Hz, 5 V rectangular wave, 60° C. | | | Voltage application time DC 40 V, 60° C. | | |
| Sample | Initial alignment | 500 (hr) | 1000 (hr) | 1500 (hr) | 250 (hr) | 500 (hr) | 750 (hr) |
| Example | | | | | | | |
| 1 | o | o | o | o | o | o | ɔ |
| 2 | o | o | o | o | o | o | ɔ |
| 3 | o | o | o | o | o | o | ɔ |
| 4 | o | o | o | Δ | o | o | Δ |
| Comparative Example | | | | | | | |
| 1 | o | Δ | x | — | x | — | — |
| 2 | o | x | — | — | x | — | — | o: Uniform alignment
Δ: Partially poor alignment (generation of domain, rubbing streak, etc.)
x: No homogeneous alignment or with alignment region of 50% or less Evaluation for obtaining the results shown in Table 1 above was performed by placing the liquid crystal panel between the two sheets of polarizing plates arranged so that the polarizing directions might cross each other, and observing the alignment state of the liquid crystal with eyes from the direction normal to the panel face. The same evaluation was conducted for obtaining the results shown in Tables 2 to 4 appearing hereinafter.

EXAMPLE 5

A base plate provided with a transparent electroconductive film comprising mainly indium oxide as the electrode on a polyethyleneterephthalate film with a thickness of 100μ was coated with a solution having the composition shown below, and dried at 120° C. for 120 min. The electrode was formed by means of a low temperature sputtering device while suppressing the film surface temperature at 120° C. or lower.

| (Solution) | |
|---|---|
| Ethyl acetate | 10 g |
| $Ta(OC_2H_5)_5$ | 0.3 g calculated as $Ta_2O_5$ |

Since $Ta(OC_2H_5)_5$ is hydrolyzable when left to stand in the air, a solution dissolved at 3.0 wt. % (calculated as $Ta_2O_5$) in the above solvent system was employed.

The solution as described above was applied on a base plate and, after drying, applied with rubbing in one direction under a pressure of 100 g/cm$^2$. Two sheets of this base plate were placed one on another so that the upper and lower rubbing directions may cross each other at right angles, and Loche RO-TN-619 liquid crystal (pyrimidine type $\Delta\epsilon>0$ nematic liquid crystal) was filled in the gap therebetween to provide a liquid crystal panel. The results of durability test of this liquid crystal panel are shown in Table 2.

EXAMPLE 6

A liquid crystal panel was prepared in the same manner as in Example 5 except for using a solution having the composition shown below. The results of durability test of the liquid crystal panel are also shown in Table 2.

| (Solution) | |
|---|---|
| Methanol/methyl ethyl ketone | 13 g/3 g |
| 6/6,6/12-nylon (Diamide X-103, produced by Dicel Kagaku Kogyo, K.K.) | 0.5 g |
| Bisphenol A type epoxy resin (Epikote 828, produced by Shell Chemical Co.) | 0.2 g |

However, the same solution of $Ta(OC_2H_5)_5$ as used in Example 5 was employed, and the amount of ethanol/methyl ethyl ketone was controlled corresponding to the amount of the solvent system to make the ratio of $(Ta(OC_2H_5)_5 + nylon + epoxy\ resin)/solution$ constant.

EXAMPLE 7

A liquid crystal panel was prepared in the same manner as in Example 5, except for applying the solution II in layers on the coating of the solution I applied on the base plate, followed by drying at 120° C. for 120 minutes. In the above, the two solutions were applied respectively by the spinner coating method under the conditions to 1000 rpm, 120° C. and 30 minutes. The results of durability test of this liquid crystal panel are also shown in Table 2.

| (Solution I) | |
|---|---|
| Butanol | 15 g |
| $Ta(OC_2H_5)_5$ | 0.3 g as $Ta_2O_5$ |

| (Solution II) | |
|---|---|
| Ethanol/butanol | 13 g/3 g |
| Nylon | 0.4 g |
| Epoxy resin | 0.2 g |

The same $Ta(OC_2H_5)_5$ as used in Example 5 was employed, and the same nylon and epoxy resin as used in Example 6 were employed.

COMPARATIVE EXAMPLE 3

Except for changing $Ta(OC_2H_5)_5$ used in Example 5 to tetraoctyl titanate, a liquid crystal panel was prepared in the same manner as in Example 5. The results of durability test of this liquid crystal are also shown in Table 2.

COMPARATIVE EXAMPLE 4

Except for changing $Ta(OC_2H_5)_5$ used in Example 5 to zirconium octylate, a liquid crystal panel was prepared in the same manner as in Example 5. The results of durability test of this liquid crystal are also shown in Table 2.

COMPARATIVE EXAMPLE 5

Except for changing $Ta(OC_2H_5)_5$ used in Example 7 to tetraoctyl titanate, a liquid crystal panel was prepared in the same manner as in Example 7. The results of durability test of this liquid crystal are also shown in Table 2.

TABLE 2

| | Item | | | | | | |
|---|---|---|---|---|---|---|---|
| | | Voltage application time AC 32 Hz, 5 V rectangular wave, 60° C. | | | Voltage application time DC 40 V, 60° C. | | |
| Sample | Initial alignment | 500 (hr) | 1000 (hr) | 1500 (hr) | 250 (hr) | 500 (hr) | 750 (hr) |
| Example | | | | | | | |
| 5 | o | o | o | o | o | o | o |
| 6 | o | o | o | o | o | o | o |
| 7 | o | o | o | o | o | o | o |
| Comparative Example | | | | | | | |
| 3 | o | Δ | x | — | Δ | x | — |
| 4 | o | x | — | — | x | — | — |
| 5 | o | Δ | x | — | Δ | x | — | o: Uniform alignment
Δ: Partially poor alignment (generation of domain, rubbing streak, etc.)
x: No homogeneous alignment or with alignment region of 50% or less

EXAMPLE 8

A base plate provided with a transparent electroconductive film comprising mainly indium oxide as the electrode on a polyethyleneterephthalate film with a thickness of 100μ was coated with Solution I having the following composition, then coated in layers with Solution II, and dried at 120° C. for 120 minutes. The electrode was formed by means of a low temperature sputtering device, while suppressing the film surface temperature at 120° C. or lower.

| (Solution I) | |
|---|---|
| Ethyl acetate | 7 g |
| In-(-$OC_3H_7$)$_3$ solution | 3 g (0.07 g calculated as $In_2O_3$) |

The In—$OC_3H_7$)$_3$ solution was a solution of 2.5 wt. % (calculated as $In_2O_3$) of $In(OC_3H_7)_3$ dissolved in the solvent system shown below. This solution was employed, because of hydrolyzability of $In(OC_3H_7)_3$

| Solvent system | |
|---|---|
| n-Butanol | 9.6 wt. % |

-continued

| Solvent system | |
|---|---|
| Isopropyl alcohol | 12.0 wt. % |
| Acetylacetone | 1.2 wt. % |
| Propionic acid | 14.4 wt. % |
| Ethanol | 19.2 wt. % |
| Turpentine oil | 3.6 wt. % |
| Ethyl acetate | 40 wt. % |

| (Solution II) | |
|---|---|
| Ethanol | 6 g |
| Butanol | 4 g |
| 6/6,6/12-nylon (Diamide X-103, produced by Dicel Kagaku Kogyo) | 0.05 g |
| Bisphenol A type epoxy resin (Epikote 828, produced by Shell Chemical Co.) | 0.02 g |

The solution as described above was applied on a base plate and, after drying, applied with rubbing in one direction under a pressure of 100 g/cm². Two sheets of this base plate were placed one on another so that the upper and lower rubbing directions may cross each other at right angles, and Loche RO-TN-619 liquid crystal (pyrimidine type $\Delta\epsilon>0$ nematic liquid crystal) was filled in the gap therebetween to provide a liquid crystal panel. The results of durability test of this liquid crystal panel are shown in Table 3.

EXAMPLE 9

A liquid crystal panel was prepared in the same manner as in Example 8 except for using Epikote 815 (trade name, produced by Shell Chemical Co.) with a viscosity of 8-11 cp and an epoxy equivalent of 183-hin place of Epikote 828. The results of durability test of this liquid crystal panel are also shown in Table 3.

EXAMPLE 10

A liquid crystal panel was prepared in the same manner as in Example 8 except for changing Solution I in Example 8 to the composition of Solution III shown below. The results of durability test of this liquid crystal panel are also shown in Table 3.

| (Solution III) | |
|---|---|
| Ethyl acetate | 96 g |
| In(OC$_8$H$_{17}$)$_3$ | 4 g |

COMPARATIVE EXAMPLE 6

A liquid crystal panel was prepared in the same manner as in Example 8, except for changing the alkoxy indium used in Example 8 to tetraoctyl titanate. The results of durability test of this liquid crystal panel are also shown in Table 3.

COMPARATIVE EXAMPLE 7

A liquid crystal panel was prepared in the same manner as in Example 8, except for changing the alkoxy indium used in Example 8 to aluminum octylate. The results of durability test of this liquid crystal panel are also shown in Table 3.

TABLE 3

| | | Item | | | | | |
|---|---|---|---|---|---|---|---|
| | | Voltage application time AC 32 Hz, 5 V rectangular wave, 60° C. | | | Voltage application time DC 40 V, 60° C. | | |
| Sample | Initial alignment | 500 (hr) | 1000 (hr) | 1500 (hr) | 250 (hr) | 500 (hr) | 750 (hr) |
| Example | | | | | | | |
| 8 | o | o | o | o | o | o | o |
| 9 | o | o | o | o | o | o | o |
| 10 | o | o | o | o or Δ | o | o | o or Δ |
| Comparative Example | | | | | | | |
| 6 | o | Δ | x | — | Δ | x | — |
| 7 | o | x | — | — | x | — | — | o: Uniform alignment
Δ: Partially poor alignment (generation of domain, rubbing streak, etc.)
x: No homogeneous alignment or with alignment region of 50% or less

EXAMPLE 11

A base plate provided with a transparent electroconductive film comprising mainly indium oxide as the electrode on a polyethyleneterephthalate film with a thickness of 100μ was coated with a solution having the composition shown below, and dried at 120° C. for 120 minutes.

| (Solution) | |
|---|---|
| Ethanol | 10 g |
| In-(-AA)* solution | 30 g |
| 6/6,6/12-nylon (Diamide X-103, produced by Dicel Kagaku Kogyo) | 0.1 g |
| Bisphenol A type epoxy resin (Epikote 828, produced by Shell Chemical Co.) | 0.08 g |

*In-(-AA) denotes indium acetyl acetonate.

The In—AA) solution was a solution of 2.5 wt. % (calculated at In$_2$O$_3$) of In—AA) dissolved in the solvent system shown below and employed because of the hydrolyzability of In—AA).

| Solvent system | |
|---|---|
| n-Butanol | 9.6 wt. % |
| Isopropyl alcohol | 12.0 wt. % |
| Acetylacetone | 1.2 wt. % |
| Propionic acid | 14.4 wt. % |
| Ethanol | 19.2 wt. % |
| Turpentine oil | 3.6 wt. % |
| Ethyl acetate | 40 wt. % |

The solution as described above was applied on a base plate and, after drying, applied with rubbing in one direction under a pressure of 100 g/cm². Two sheets of this base plate were placed one on another so that the upper and lower rubbing directions may cross each other, and Loche RO-TN-619 liquid crystal (pyrimidine type $\Delta\epsilon>0$ nematic liquid crystal) was filled in the gap therebetween to provide a liquid crystal panel. The results of durability test of this liquid crystal panel are shown in Table 4.

EXAMPLE 12

A liquid crystal was prepared in the same manner as in Example 11 except for applying the Solution II on the coating of the Solution I shown below on the base plate.

The results of durability test of this liquid crystal panel are also shown in Table 4.

| (Solution I) | |
|---|---|
| Butanol | 10 g |
| In-(-AA) solution | 0.7 g |
| In-(-OC₃H₇)₃ solution | 0.02 g |

| (Solution II) | |
|---|---|
| Ethanol/methyl ethyl ketone | 8 g/2 g |
| Nylon | 0.003 g |
| Epoxy resin | 0.002 g |

As the In—AA) solution, nylon and epoxy resin, those as employed in Example 11 were used. The IN-(OC₃H₇)₃ solution was a solution of 2.5 wt. % (calculated In₂O₃) of In(OC₃H₇)₃ dissolved in the solvent system shown below.

| Solvent system | |
|---|---|
| n-Butanol | 16 wt. % |
| Isopropyl alcohol | 20 wt. % |
| Acetylacetone | 2 wt. % |
| Propionic acid | 24 wt. % |
| Ethanol | 32 wt. % |
| Turpentine oil | 6 wt. % |

TABLE 4

| | Item | | | | | | |
|---|---|---|---|---|---|---|---|
| | | Voltage application time AC 32 Hz, 5 V rectangular wave, 60° C. | | | Voltage application time DC 40 V, 60° C. | | |
| Sample | Initial alignment | 500 (hr) | 1000 (hr) | 1500 (hr) | 250 (hr) | 500 (hr) | 750 (hr) |
| Example | | | | | | | |
| 11 | o | o | o | o | o | o | o |
| 12 | o | o | o | o | o | o | o | o: Uniform alignment

As described above, according to the present invention, a liquid crystal panel extremely excellent in durability, i.e., long-term performance, can be obtained. Besides, the alignment controlling film of said liquid crystal panel can exhibit the above durability and excellent orienting or alignment controlling action by low temperature heating, and therefore can also be utilized in the case of using a plastic substrate or providing switching elements with poor heat resistance in combination, whereby productivity of the liquid crystal panel can be improved.

What is claimed is:

1. A liquid crystal device, comprising:
a pair of base plates and a liquid crystal disposed between the base plates, at least one of said pair of base plates having a coating film formed from a coating solution containing a nylon, an epoxy resin and at least one member selected from the group consisting of organic tantalum compounds and organic indium compounds.

2. A liquid crystal device according to claim 1, wherein said organic tantalum compounds are represented by the formula Ta—OR¹)₅ wherein R¹ represents an alkyl group.

3. A liquid crystal device according to claim 2, wherein said alkyl group is ethyl.

4. A liquid crystal device according to claim 1, wherein said indium compounds are represented by the formula In—OR²)₃ wherein R² represents an alkyl group.

5. A liquid crystal device according to claim 4, wherein said alkyl group is isopropyl.

6. A liquid crystal device according to claim 1, wherein said organic indium compound is indium acetylacetonate.

7. A liquid crystal device according to claim 1, wherein said coating solution contains two kinds of organic indium compounds of indium acetylacetonate and a compound represented by the formula In—OR²)₃ wherein R² represents an alkyl group.

8. A liquid crystal device according to claim 1, wherein said nylon is a nylon copolymer.

9. A liquid crystal device according to claim 1, wherein said nylon is an alcohol soluble nylon.

10. A liquid crystal device according to claim 1, wherein said nylon is 12-nylon or a copolymer of 12-nylon.

11. A liquid crystal device according to claim 8, wherein said nylon copolymer is at least one copolymer selected from the group consisting of 6/6,6-nylon, 11-nylon, 6/6,6/11-nylon, 6,6/11-nylon and 6/6,6/12-nylon.

12. A liquid crystal device according to claim 1, wherein said nylon has a melting point peak at 80° to 130° C.

13. A liquid crystal device according to claim 1, wherein said epoxy resin is an epoxy resin selected from the group consisting of glycidyl ether type epoxy resins, glycidyl ester type epoxy resins, bisphenol type epoxy resins, glycidyl amine type epoxy resins, cyclic aliphatic type epoxy resins and linear aliphatic type epoxy resins.

14. A liquid crystal device according to claim 13, wherein said bisphenol type epoxy resin is a bisphenol type epoxy resin.

15. A liquid crystal device according to claim 14, wherein said bisphenol type epoxy resin is a bisphenol A type epoxy resin represented by the formula:

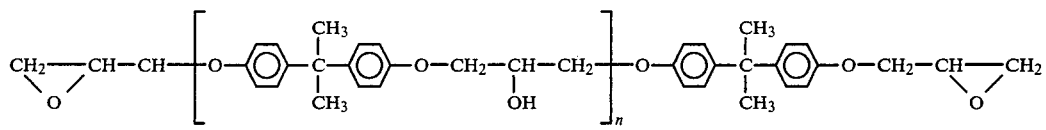

wherein n is 0 to 4.

16. A liquid crystal device according to claim 1, wherein said coating film is arranged adjacent to the liquid crystal layer and the plane of said coating film has a uniaxial orientation axis for aligning the liquid crystal molecules in one direction.

17. A liquid crystal device according to claim 16, wherein said uniaxial orientation axis is formed by rubbing treatment.

18. A liquid crystal device according to claim 1, wherein at least one of said pair of base plates is a plastic film.

19. A liquid crystal device according to claim 18, wherein said plastic film is a film of polyester, polyethersulfone, polysulfone, polycarbonate, cellulose acetate, diene type rubber, acrylic resin or urethane resin.

20. A liquid crystal device according to claim 19, wherein said polyester is polyethyleneterephthalate, polypropyleneterephthalate or polybutyleneterephthalate.

21. A liquid crystal device, comprising:
a pair of base plates and a liquid crystal disposed between the base plates, at least one of said pair of base plates having a coating film formed from a coating solution containing an organic tantalum compound, said coating film being disposed adjacent to the liquid crystal and having a surface with a uniaxial orientation axis for aligning the liquid crystal molecules in one direction.

22. A liquid crystal device according to claim 21, wherein said organic tantalum compound is represented by the formula Ta—OR$^1$)$_5$ wherein R$^1$ represents an alkyl group.

23. A liquid crystal device according to claim 22, wherein said alkyl group is ethyl.

24. A liquid crystal device according to claim 23, wherein said uniaxial orientation axis is an axis formed by rubbing treatment.

25. A liquid crystal device according to claim 21, wherein said plastic film is a film of polyester, polyethersulfone, polysulfone, polycarbonate, cellulose acetate, diene type rubber, acrylic resin or urethane resin.

26. A liquid crystal device according to claim 25, wherein said polyester is polyethyleneterephthalate, polypropyleneterephthalate or polybutyleneterephthalate.

27. A liquid crystal device, comprising:
a pair of base plates and a liquid crystal disposed between the base plates, at least one of said pair of base plates having a coupling agent layer comprising at least one compound selected from the groups consisting of organic tantalum compounds and organic indium compounds, and a coating film disposed by the medium of the coupling agent layer and formed from a coating solution containing a coating solution containing a nylon and an epoxy resin, said coating film being disposed adjacent to the liquid crystal and having a surface with a uniaxial orientation axis for aligning the liquid crystal molecules in one direction.

28. A liquid crystal device according to claim 27, wherein said organic tangalum compounds are represented by the formula Ta—OR$^1$)$_5$ wherein R$^1$ represents an alkyl group.

29. A liquid crystal device according to claim 28, wherein said alkyl group is ethyl.

30. A liquid crystal device according to claim 27, wherein said indium compounds are represented by the formula In—OR$^2$)$_3$ wherein R$^2$ represents an alkyl group.

31. A liquid crystal device according to claim 30, wherein said alkyl group is isopropyl.

32. A liquid crystal device according to claim 27, wherein said organic indium compound is indium acetylacetonate.

33. A liquid crystal device according to claim 27, wherein said nylon is an alcohol soluble nylon.

34. A liquid crystal device according to claim 27, wherein said nylon is 12-nylon or a copolymer of 12-nylon.

35. A liquid crystal device according to claim 27, wherein said nylon is a nylon copolymer.

36. A liquid crystal device according to claim 35, wherein said nylon copolymer is at least one copolymer selected from the group consisting of 6/6,6-nylon, 11-nylon, 6/6,6/11-nylon, 6,6/11-nylon and 6/6,6/12-nylon.

37. A liquid crystal device according to claim 27, wherein said nylon has a melting point peak at 80° to 130° C.

38. A liquid crystal device according to claim 27, wherein said epoxy resin is an epoxy resin selected from the group consisting of glycidyl ether type epoxy resins, glycidyl ester type epoxy resins, bisphenol type epoxy resins, glycidyl amine type epoxy resins, cyclic aliphatic type epoxy resins and linear aliphatic type epoxy resins.

39. A liquid crystal device according to claim 38, wherein said bisphenol type epoxy resin is a bisphenol type epoxy resin.

40. A liquid crystal device according to claim 39, wherein said bisphenol type epoxy resin is a bisphenol A type epoxy resin represented by the formula:

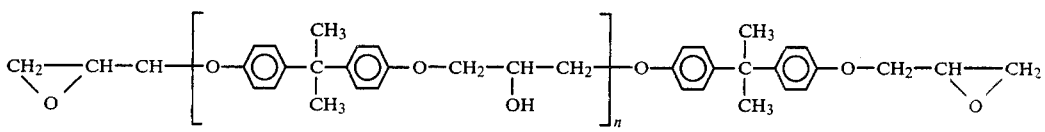

wherein n is 0 to 4.

41. A liquid crystal device according to claim 27, wherein said uniaxial orientation axis is formed by rubbing treatment.

42. A liquid crystal device according to claim 27, wherein at least one of said pair of base plates is a plastic film.

43. A liquid crystal device according to claim 42, wherein said plastic film is a film of polyester, polyethersulfone, polysulfone, polycarbonate, cellulose acetate, diene type rubber, acrylic resin or urethane resin.

44. A liquid crystal device according to claim 43, wherein said polyester is polyethyleneterephthalate, polypropyleneterephthalate or polybutyleneterephthalate.

* * * * *

UNITED STATES PATENT AND TRADEMARK OFFICE
CERTIFICATE OF CORRECTION

PATENT NO. : 4,615,919
DATED : October 7, 1986
INVENTOR(S) : HIROSHI INOUE, ET AL.  Page 1 of 4

It is certified that error appears in the above-identified patent and that said Letters Patent is hereby corrected as shown below:

COLUMN 2

Line 54, "Ta-OR$^1$)$_5$" should read --Ta$($OR$^1$)$_5$--.

Line 56, "Ta-OC$_2$H$_5$)$_5$" should read --Ta$($OC$_2$H$_5$)$_5$--.

Line 61, "In-OR$^2$)$_3$" should read --In$($OR$^2$)$_3$--.

Line 62, "R$^2$ an" should read --R$^2$ is an--.

COLUMN 3

Line 24, "respectively" should read --of--.

COLUMN 4

Line 6, "etc ," should read --etc.,--.
Line 19, "spraylng" should read --spraying--.
Line 41, "1s" should read --is--.
Line 47, "controlllng" should read --controlling--.
Line 54, "components non-reactivity" should read --components, non-reactivity--.

COLUMN 5

Line 58, "ca be" should read --can be--.

COLUMN 6

Line 19, "In-OR$^2$)$_3$" should read --In$($OR$^2$)$_3$--.

Line 24, "agent Also," should read --agent. Also,--.
Line 41, "fllm" should read --film--.

UNITED STATES PATENT AND TRADEMARK OFFICE
CERTIFICATE OF CORRECTION

PATENT NO.  : 4,615,919
DATED       : October 7, 1986
INVENTOR(S) : HIROSHI INOUE, ET AL.

Page 2 of 4

It is certified that error appears in the above-identified patent and that said Letters Patent is hereby corrected as shown below:

COLUMN 7

Line 29, "In-OC$_3$H$_7$)$_3$" should read --In$\pm$OC$_3$H$_7$)$_3$--.

COLUMN 10

Line 61, "In-OC$_3$H$_7$)$_3$" should read --In$\pm$OC$_3$H$_7$)$_3$--.

Lines 63-64, "employed, because" should read --employed because--.

COLUMN 11

Line 37, "183-$\frac{1}{4}$in" should read --183-193 in--.

COLUMN 12

Line 40, "In-AA)" should read --In$\pm$AA)--.
Line 41, "at" should read --as--.
Line 41, "In-AA)" should read --In$\pm$AA)--.
Line 43, "In-AA)." should read --In$\pm$AA).--.

COLUMN 13

Line 16, "In-AA)" should read --In$\pm$AA)--.
Lines 17-18, "IN-(OC$_3$H$_7$)$_3$" should read --In(OC$_3$H$_7$)$_3$--.
Lines 18-19, "calcu-lated In$_2$O$_3$)" should read --(calculated as In$_2$O$_3$)--.

UNITED STATES PATENT AND TRADEMARK OFFICE
CERTIFICATE OF CORRECTION

PATENT NO. : 4,615,919
DATED : October 7, 1986
INVENTOR(S) : HIROSHI INOUE, ET AL.   Page 3 of 4

It is certified that error appears in the above-identified patent and that said Letters Patent is hereby corrected as shown below:

COLUMN 14

Line 5, "Ta-OR$^1$)$_5$" should read --Ta$(OR^1)_5$--.
Line 11, "In-OR$^2$)$_3$" should read --In$(OR^2)_3$--.
Line 21, "In-OR$^2$)$_3$" should read --In$(OR^2)_3$--.
Lines 32-33, "11-nylon," should read --6/11-nylon,--.
Line 45, after "said" delete "bisphenol type".

COLUMN 15

Line 23, "Ta-OR$^1$)$_5$" should read --Ta$(OR^1)_5$--.
Line 63, "tangalum" should read --tantalum--.

UNITED STATES PATENT AND TRADEMARK OFFICE
CERTIFICATE OF CORRECTION

PATENT NO. : 4,615,919
DATED : October 7, 1986
INVENTOR(S) : HIROSHI INOUE, ET AL.

It is certified that error appears in the above-identified patent and that said Letters Patent is hereby corrected as shown below:

COLUMN 16

Line 1, "Ta-OR$^1$)$_5$" should read --Ta$(OR^1)_5$--.

Line 7, "In-OR$^2$)$_3$" should read --In$(OR^2)_3$--.

Lines 23-24, "11-nylon," should read --6/11-nylon,--.
Line 36, after "said" delete "bisphenol type".

Signed and Sealed this

Third Day of March, 1987

Attest:

DONALD J. QUIGG

Attesting Officer

Commissioner of Patents and Trademarks